(12) United States Patent
Sewell

(10) Patent No.: US 11,858,761 B2
(45) Date of Patent: Jan. 2, 2024

(54) OFFLOADING VACUUM TANK

(71) Applicant: The Charles Machine Works, Inc., Perry, OK (US)

(72) Inventor: Cody L. Sewell, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 20 days.

(21) Appl. No.: 17/371,981

(22) Filed: Jul. 9, 2021

(65) Prior Publication Data

US 2021/0331881 A1 Oct. 28, 2021

Related U.S. Application Data

(63) Continuation of application No. 16/223,568, filed on Dec. 18, 2018, now Pat. No. 11,059,682.

(60) Provisional application No. 62/609,070, filed on Dec. 21, 2017.

(51) Int. Cl.
| | |
|---|---|
| *B65G 67/04* | (2006.01) |
| *B65G 33/14* | (2006.01) |
| *B65G 33/10* | (2006.01) |
| *E02F 5/08* | (2006.01) |
| *E02F 7/00* | (2006.01) |
| *B01D 45/12* | (2006.01) |
| *B01D 50/20* | (2022.01) |

(52) U.S. Cl.
CPC ............. *B65G 67/04* (2013.01); *B01D 45/12* (2013.01); *B01D 50/20* (2022.01); *B65G 33/10* (2013.01); *B65G 33/14* (2013.01); *E02F 7/00* (2013.01); *B65G 2812/0577* (2013.01); *B65G 2814/0326* (2013.01); *E02F 5/08* (2013.01)

(58) Field of Classification Search
CPC ........ B65G 67/04; B65G 33/10; B65G 33/14; B65G 2812/0577; B65G 2814/0326; B01D 50/20; B01D 45/12; E02F 7/00; E02F 5/08

See application file for complete search history.

(56) References Cited

U.S. PATENT DOCUMENTS

| | | | |
|---|---|---|---|
| 187,768 A | 2/1877 | Munzinger | |
| 522,137 A | 6/1894 | Walker | |
| 1,287,290 A | 12/1918 | Golden | |
| 1,311,009 A | 7/1919 | Rinehimer | |
| 1,944,976 A | 1/1934 | Hamilton | |
| 2,264,216 A | 11/1941 | Milligan | |
| 2,341,087 A * | 2/1944 | Dunham | B04C 5/28 |
| | | | 55/343 |
| 2,352,192 A | 6/1944 | Gasche | |
| 2,556,354 A | 6/1951 | Williamson et al. | |
| 2,639,144 A | 5/1953 | Long | |
| 2,639,601 A | 5/1953 | Miller | |

(Continued)

*Primary Examiner* — Saul Rodriguez
*Assistant Examiner* — Ashley K Romano
(74) *Attorney, Agent, or Firm* — Tomlinson McKinstry, P.C.

(57) ABSTRACT

An offloading vacuum system. The system has a tank to capture debris from an excavation site. The debris is pulled into the tank due to a blower pulling air into an attached hose. An internal conveyor within the tank conveys material to an offloading hub. The offloading hub has a ground-facing door which opens to deposit debris into an external conveyor. The external conveyor, when deployed, can move debris from below the tank to a dump container with a wall greater than a height of the tank.

20 Claims, 13 Drawing Sheets

(56) References Cited

U.S. PATENT DOCUMENTS

| | | | |
|---|---|---|---|
| 2,734,656 A | 2/1956 | Schonfeld | |
| 2,816,683 A | 12/1957 | Miers et al. | |
| 2,823,825 A | 2/1958 | Coffman | |
| 2,867,329 A | 1/1959 | Miller | |
| 2,927,787 A | 3/1960 | Maher | |
| 3,195,761 A | 7/1965 | Coates | |
| 3,311,255 A | 3/1967 | Loveless | |
| 3,540,618 A | 11/1970 | Jakobsen | |
| 3,628,687 A | 12/1971 | Townsend | |
| 3,713,472 A | 1/1973 | Dozois | |
| 3,768,203 A | 10/1973 | Bellucci | |
| 3,841,676 A | 10/1974 | Hover | |
| 3,860,142 A | 1/1975 | Jurges | |
| 3,870,489 A * | 3/1975 | Shaddock | B04C 9/00 15/328 |
| 3,888,045 A | 6/1975 | Piegza | |
| 3,924,778 A | 12/1975 | Sorensen | |
| 4,017,281 A | 4/1977 | Johnstone | |
| 4,119,238 A | 10/1978 | Ja'afar et al. | |
| 4,135,640 A | 1/1979 | MacQuilkin et al. | |
| 4,155,586 A | 5/1979 | Flynn | |
| 4,199,837 A | 4/1980 | Fisco, Jr. | |
| 4,222,404 A | 9/1980 | Flynn | |
| 4,307,541 A | 12/1981 | Farmer et al. | |
| 4,334,633 A | 6/1982 | Piegza | |
| 4,518,095 A | 5/1985 | Engwert | |
| 4,566,375 A | 1/1986 | van der Schoot | |
| 4,644,874 A | 2/1987 | Kleykamp | |
| 4,669,628 A | 6/1987 | Hatta | |
| 4,690,070 A | 9/1987 | Miller | |
| 4,922,571 A | 5/1990 | Driear | |
| 5,016,717 A | 5/1991 | Simons et al. | |
| 5,021,156 A | 6/1991 | Sloan | |
| 5,092,963 A | 3/1992 | Barker et al. | |
| 5,103,592 A | 4/1992 | Janitzky | |
| 5,120,217 A | 6/1992 | O'Brien et al. | |
| 5,141,528 A | 8/1992 | Boczkiewicz et al. | |
| 5,191,993 A | 3/1993 | Wanger et al. | |
| 5,299,370 A | 4/1994 | Gyori et al. | |
| 5,366,317 A | 11/1994 | Solimar | |
| 5,394,650 A | 3/1995 | Dean | |
| 5,596,788 A | 1/1997 | Linville et al. | |
| 5,700,043 A | 12/1997 | Rohard et al. | |
| 5,791,073 A | 8/1998 | Palmer et al. | |
| 5,919,421 A | 7/1999 | Monz et al. | |
| 5,937,581 A | 8/1999 | Matye et al. | |
| 5,960,980 A | 10/1999 | Burke et al. | |
| 6,007,270 A | 12/1999 | Bowman | |
| 6,050,199 A | 4/2000 | Anderson et al. | |
| 6,055,775 A | 5/2000 | Dering et al. | |
| 6,109,823 A | 8/2000 | Halferty et al. | |
| 6,182,952 B1 | 2/2001 | Guiterrez | |
| 6,293,051 B1 | 9/2001 | Matye | |
| 6,385,867 B1 | 5/2002 | Slabach et al. | |
| 6,386,598 B1 | 5/2002 | Dykstra et al. | |
| 6,391,258 B1 | 5/2002 | Peake et al. | |
| 6,438,792 B1 | 8/2002 | Cappellotto | |
| 6,407,605 B1 | 10/2002 | Gilman et al. | |
| 6,615,849 B1 | 9/2003 | Gilman et al. | |
| 6,966,724 B2 | 11/2005 | Robinson | |
| 7,255,039 B2 | 8/2007 | Halliday et al. | |
| 7,451,521 B2 | 11/2008 | Cappellotto | |
| 7,712,181 B2 | 5/2010 | Riach | |
| 7,802,694 B2 | 9/2010 | Lee | |
| 7,837,050 B2 | 11/2010 | Maybury, Jr. | |
| 8,066,140 B1 | 11/2011 | Young et al. | |
| 8,297,463 B2 | 10/2012 | McQuaid et al. | |
| 8,360,260 B2 | 1/2013 | Maybury, Jr. | |
| 8,540,103 B2 | 9/2013 | Lollis et al. | |
| 8,596,697 B1 | 12/2013 | Haibel | |
| 8,667,717 B2 | 3/2014 | Maybury et al. | |
| 8,802,023 B1 | 8/2014 | Lewis et al. | |
| 8,925,753 B2 | 1/2015 | Maybury | |
| 9,057,180 B1 | 6/2015 | Sewell | |
| 9,103,091 B2 | 8/2015 | Buckner | |
| 9,821,953 B2 | 11/2017 | Sewell et al. | |
| 10,150,619 B2 | 12/2018 | Wiedemann | |
| 10,259,647 B2 | 4/2019 | McCoy | |
| 10,383,278 B2 * | 8/2019 | Nelson | B60K 11/02 |
| 10,851,517 B2 | 12/2020 | Pino, Jr. et al. | |
| 2002/0000748 A1 | 1/2002 | Fuller et al. | |
| 2003/0217534 A1 * | 11/2003 | Krisko | B01D 50/20 55/482 |
| 2004/0108317 A1 | 6/2004 | Buckner | |
| 2005/0274094 A1 * | 12/2005 | DeMarco | B01D 50/20 55/356 |
| 2006/0032095 A1 | 2/2006 | Buckner | |
| 2006/0086010 A1 | 4/2006 | Jarnecke et al. | |
| 2006/0117612 A1 | 6/2006 | Maybury, Jr. et al. | |
| 2006/0118338 A1 | 6/2006 | Maybury, Jr. | |
| 2006/0182591 A1 | 8/2006 | Hackett et al. | |
| 2006/0236499 A1 | 10/2006 | Cappellotto | |
| 2007/0261309 A1 | 11/2007 | Tommell et al. | |
| 2008/0028688 A1 | 2/2008 | Neuber | |
| 2008/0066383 A1 | 3/2008 | Decker et al. | |
| 2008/0244859 A1 | 10/2008 | Maybury | |
| 2010/0064649 A1 | 3/2010 | Harada et al. | |
| 2010/0320000 A1 | 12/2010 | Sormunen | |
| 2010/0320204 A1 | 12/2010 | Maybury, Jr. | |
| 2010/0325481 A1 | 12/2010 | Dahan et al. | |
| 2011/0107548 A1 | 5/2011 | Maybury, Jr. | |
| 2011/0296646 A1 | 12/2011 | Showley | |
| 2012/0317882 A1 | 12/2012 | Zazula | |
| 2013/0097933 A1 | 4/2013 | Royer et al. | |
| 2013/0134163 A1 | 5/2013 | Maybury, Jr. | |
| 2015/0291350 A1 | 10/2015 | Sewell et al. | |
| 2015/0308574 A1 | 10/2015 | Kegler | |
| 2017/0292306 A1 | 10/2017 | Sewell | |

* cited by examiner

OFFLOADING VACUUM TANK

FIELD

The invention is directed to a vacuum system for removing debris from an excavation site.

BACKGROUND

Microtrenching, and other applications utilizing a saw blade, allows a small trench to be uncovered in a surface. Such a system allows for minimal disruption to an existing surface during placement of a utility line or cable within the uncovered trench. A layer of grout may be placed above the cable, returning the surface to operation. One exemplary microtrenching operation is described in U.S. Pat. No. 8,375,605, the contents of which are incorporated herein by reference.

Microtrenching operations, and similar operations, generate a volume of solid debris. This debris may be uncovered dirt or loose asphalt. A vacuum system is often provided with a microtrencher to reduce dust on the jobsite and clean the excavation site.

Typically, material captured by a vacuum tank is unloaded by opening a door attached to an end of the tank. Material is removed by tipping the tank while the door is open. This configuration makes it difficult to transfer the material into a dump truck or other containers that have openings positioned high off the ground. Further, such a configuration makes controlling the removal of material from the tank difficult if, for example, only a portion of the debris is to be offloaded.

Transferring the material to a dump truck or other container may be necessary if the material is going to be reclaimed or reused. Therefore, there is a need for a mechanism that will allow more precise offloading of particulates to locations high off of the ground.

SUMMARY

The invention is directed to an apparatus. The apparatus comprises a tank, a plurality of ground contacting motive elements above which the tank is supported, an internal conveyor, a blower, and an external conveyor. The tank has an inlet and first and second outlets. The internal conveyor is situated entirely within the tank and having a discharge end situated near the second outlet. The blower is in communication with the first outlet. The external conveyor is situated entirely outside of the tank having an input end situated near the second outlet.

The invention is further directed to an apparatus. The apparatus has a tank with an inlet and first and second outlets. The apparatus also has a means for pulling earth through the first outlet and out of the tank, and a means for transporting spoils from the second outlet of the tank to a location above the upper most surface of the tank.

DETAILED DESCRIPTION

Figure 11:
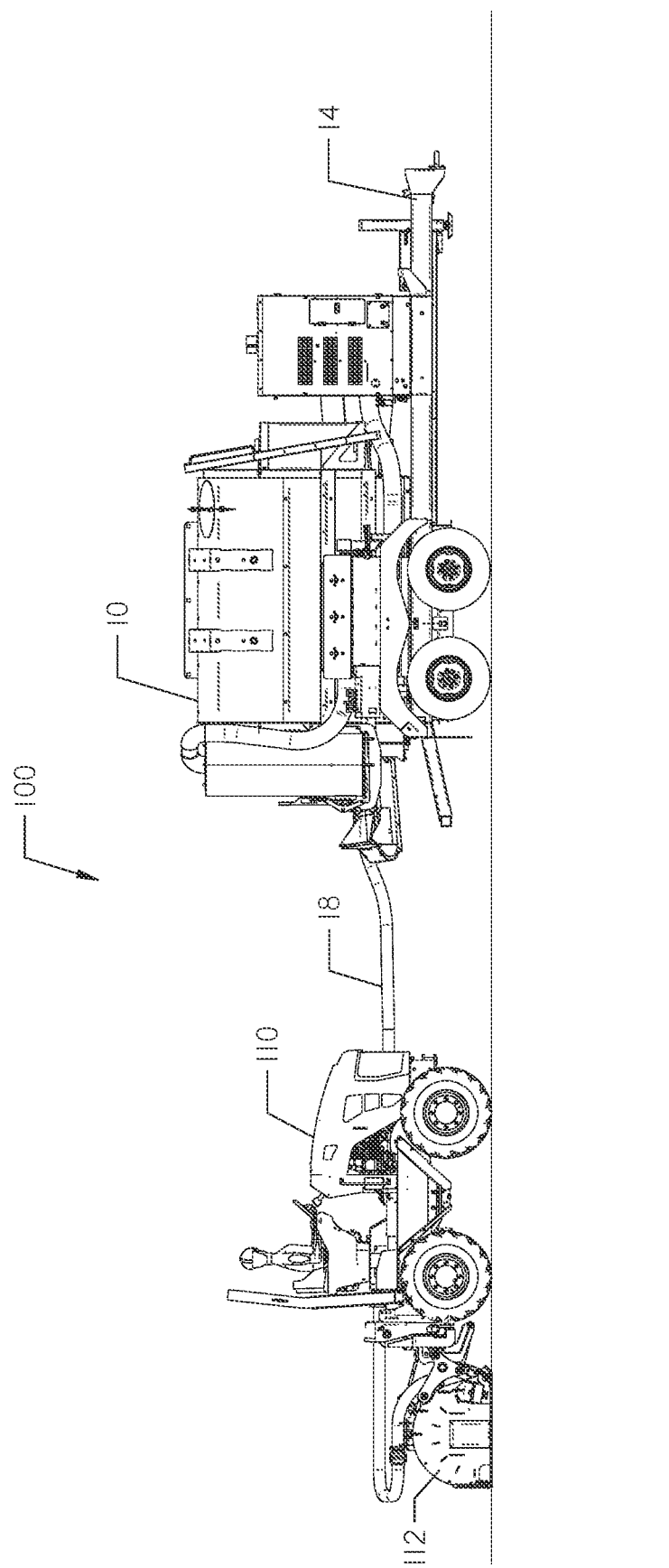
FIG. 11 is a side view of the vacuum system in use with a microtrenching assembly.
Figure 12:
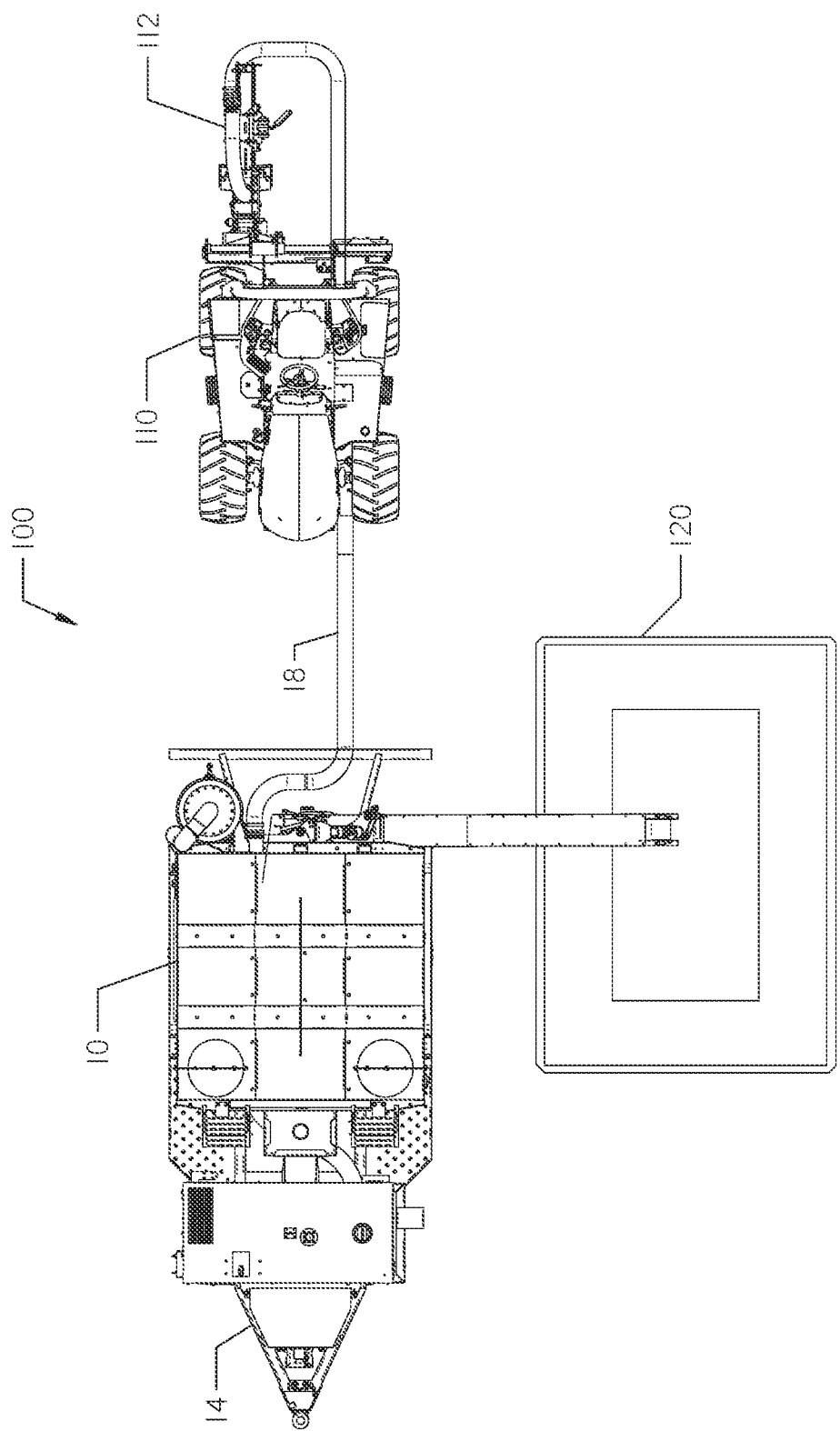
FIG. 12 is a top view of the vacuum system, a microtrenching assembly, and a dump container in series.

With reference now to FIGS. 11 and 12, a system 100 for removing spoils from a job site is shown. The system 100 comprises a microtrencher 110, a vacuum system 10, and a dump container 120. Material is removed from a trench by a blade assembly 112 disposed on the microtrencher no. The blade assembly 112 comprises a hood 114 substantially enclosing a volume around the blade (not shown).

A hose 18 is disposed between the vacuum system 10 and the microtrencher no. The hose 18 provides a pathway for air and particulates to travel from the hood 114 to the vacuum system 10. While a microtrencher 110 is shown herein, other apparatus, such as graders, trenchers, earth saws and the like may be used with the vacuum system 10 described herein. Additionally, the hose 18 may be used separately from such a device to interconnect the excavation site and the vacuum system 10.

The vacuum system 10 is shown disposed on a trailer 14. Alternatively, the vacuum system 10 may be on a self-propelled truck.

The dump container 120 is provided to deposit and store particulates removed from the vacuum assembly 10. This dump container 120 may be a dumpster, dump truck, or other container. The dump container 120 may be present on the job site, as shown, or the vacuum system 10 may be moved to a location proximate to the dump container for depositing debris removed from the vacuum assembly, as will be described in more detail below.

Figure 1:
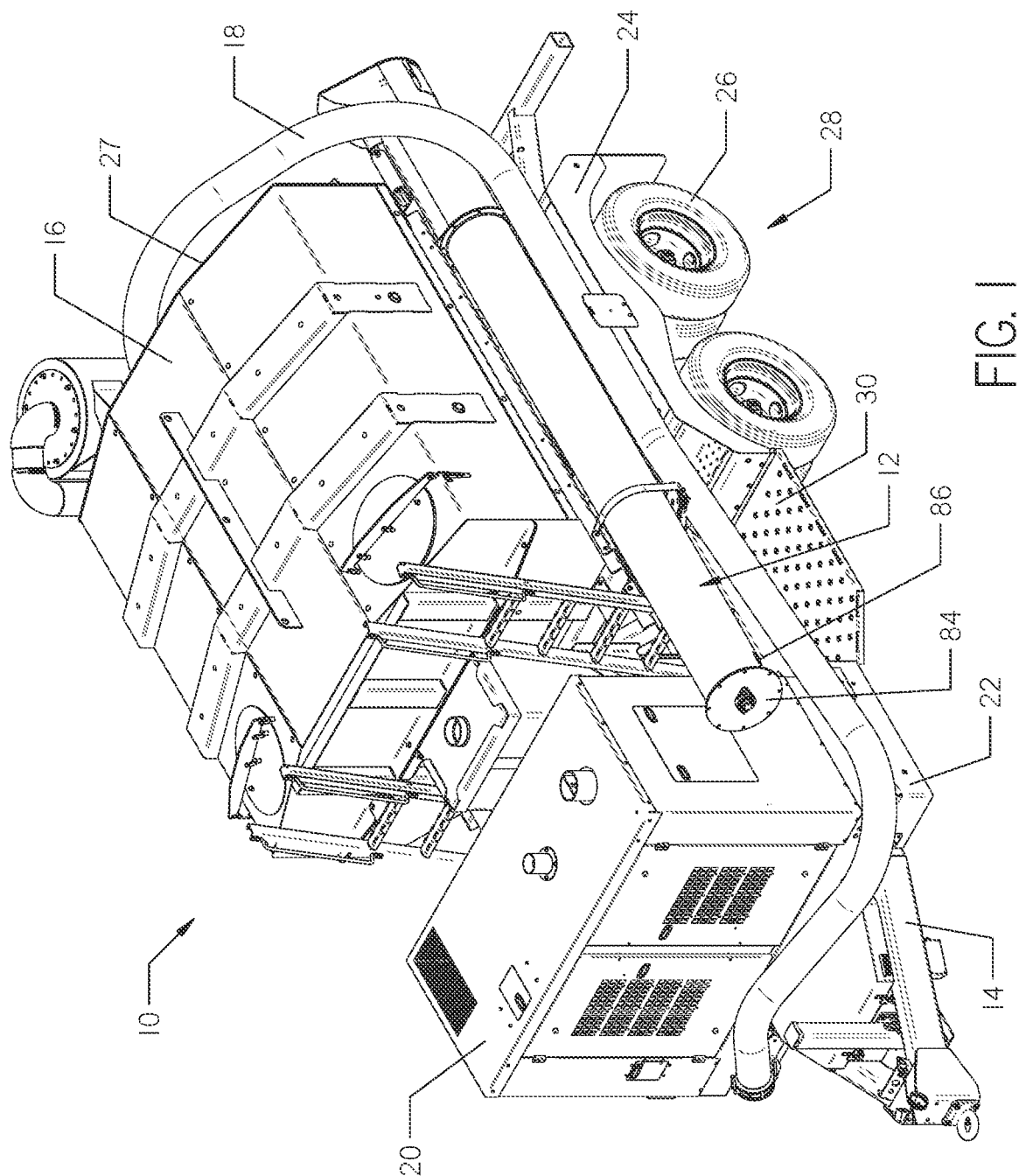
FIG. 1 is a perspective view of a first side of a vacuum system of the present invention. An external conveyor is shown in the lowered position.

With reference to FIG. 1 the vacuum system 10 is shown in detail. The vacuum system 10 comprises an external conveyor 12 attached to but completely external from a tank 16. As described in detail later herein, the external conveyor 12 may unload material captured by the system 10 and deposited in the tank 16 into a dump truck or other container positioned high off the ground.

Continuing with FIG. 1, the vacuum system 10 is supported on a trailer 14. The system 10 comprises the tank 16, first and second conduits such as hoses 18 and 19, and a power pack 20. The power pack 20 is supported on a forward end 22 of the trailer 14. The power pack 20 comprises a blower which creates airflow. The blower pulls air through a second conduit, or hose 19, from the tank 16. As the tank 16 is substantially sealed, air must be pulled into the tank through the hose 18. Such airflow allows debris to be removed from the excavation site to the tank 16.

Figure 3:
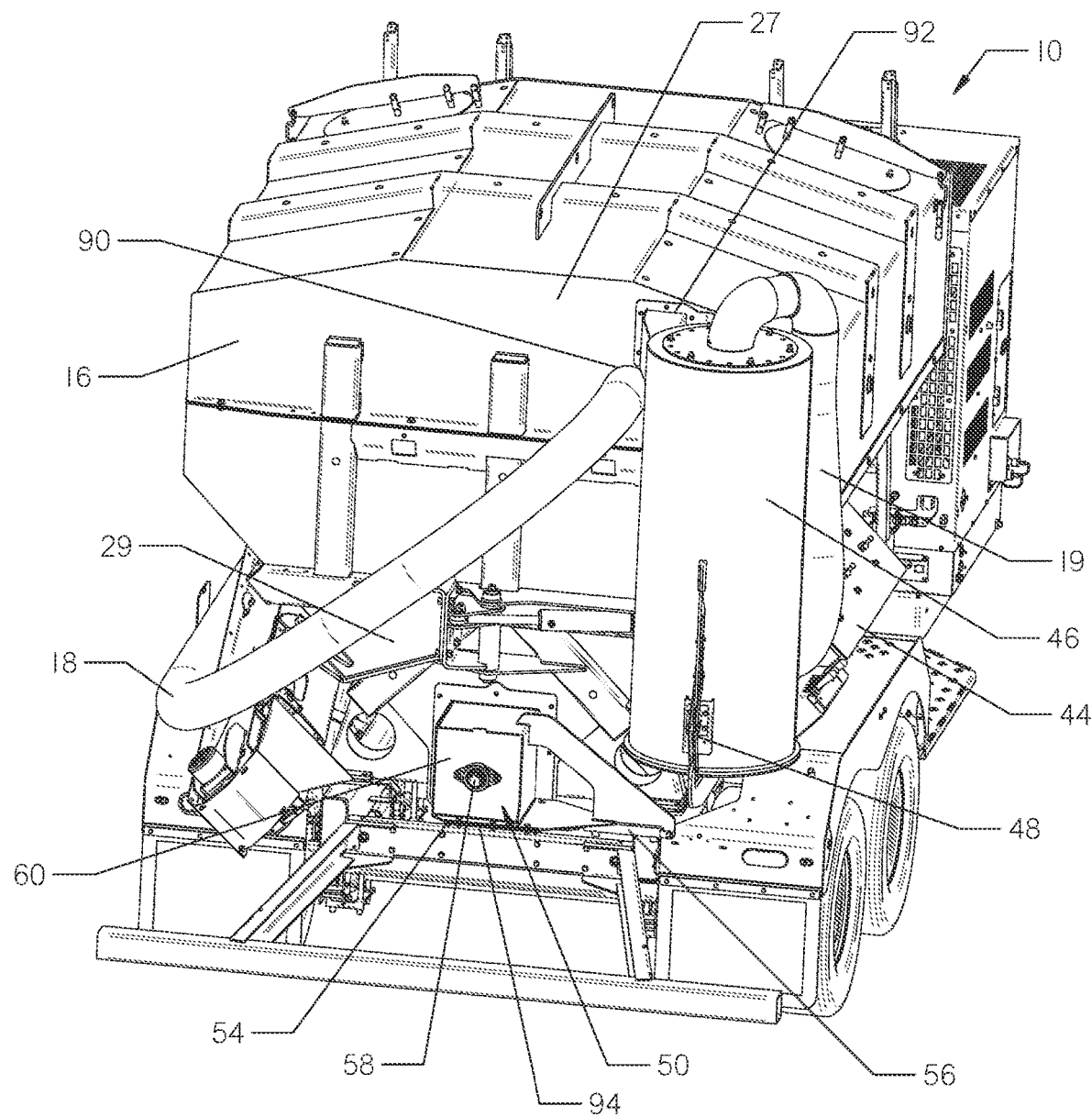
FIG. 3 is a rear perspective view of the vacuum system of FIG. 1.

The tank 16 is supported on a rear end 24 of the trailer 14 above a series of ground contacting motive elements, such as wheels 26. The tank 16 shown in the figures spans the width of the trailer 14 and has downwardly converging side walls similar to that of a funnel or a hopper (FIG. 3). However, the tank 16 may take on different shapes and sizes as desired.

The external conveyor 12 is attached to a rear end 27 of the tank 16 via a bracket 29 (FIG. 3). The external conveyor 12 is movable between a lowered or stowed position and a raised position. The external conveyor 12 is shown in a lowered or stowed position in FIG. 1, and is shown in the raised position in FIGS. 5 and 7. Preferably, the external conveyor 12 is situated completely outside of the tank 16.

Figure 5:
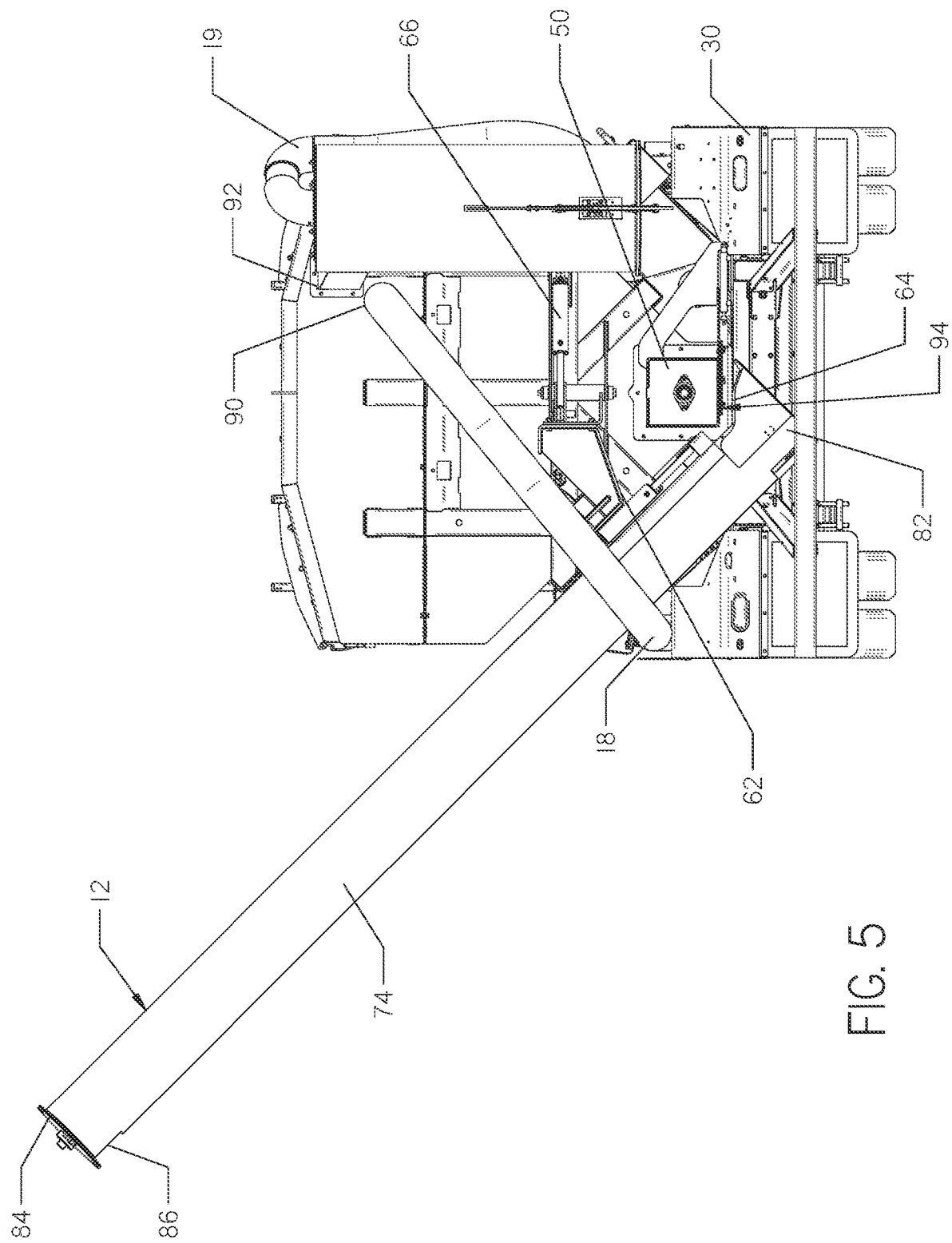
FIG. 5 is a rear view of the vacuum system. The external conveyor is shown in the raised position.

When stowed, the external conveyor 12 is positioned on a first side 28 of the vacuum system 10 and is substantially parallel to a bed 30 of the trailer 14. When the external conveyor 12 is in use, the external conveyor is in a raised position and is situated at a non-zero angle to the bed 30 of the trailer 14 (FIG. 5). For example, the external conveyor 12 is positioned at about a 45 degree angle to the bed 30 of the trailer 14 in FIG. 5. However, the external conveyor 12 may be raised or lowered to different angles as desired.

When in the raised position shown in FIG. 5, a first end 82 is situated below each portion of the tank 16. The second end 84 of the external conveyor 12 is disposed above each portion of the tank 16. This orientation allows particulates to fall from the tank 16 into the first end 82 due to gravity, yet to be removed by the external conveyor 12 into a dump container 120 with a high wall.

Figure 4:
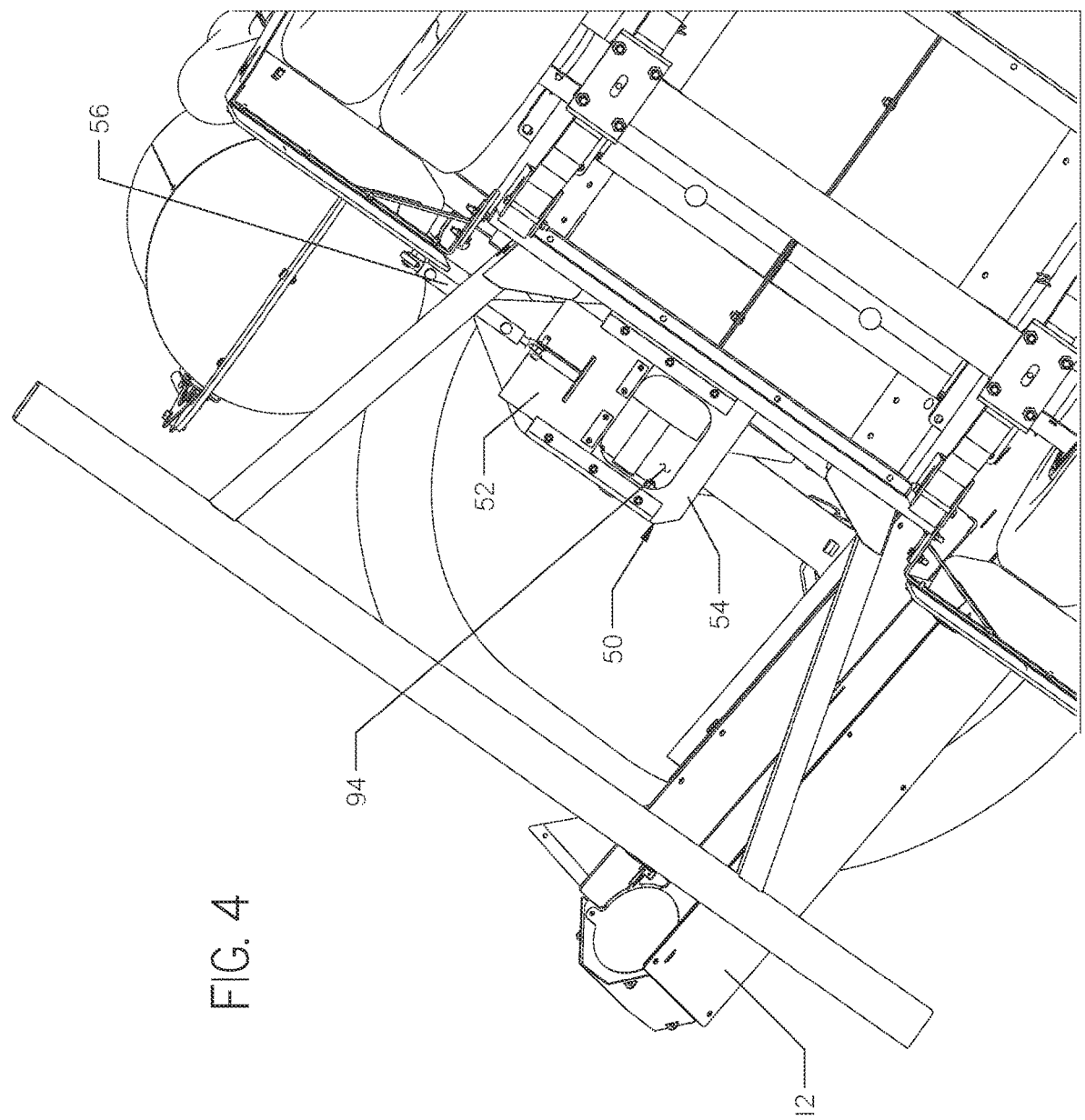
FIG. 4 is a bottom view of the rear end of the vacuum system. An offloading door is shown in an open position.

With reference to FIGS. 3-5, the tank 16 has an inlet 90, a first outlet 92 and a second outlet 94. The hose 18 is attached to the inlet 90. The hose 19 allows the blower to be in communication with the first outlet 92. The second outlet 94 is located at an offloading hub 50 and may be selectively covered by a door 52.

Figure 2:
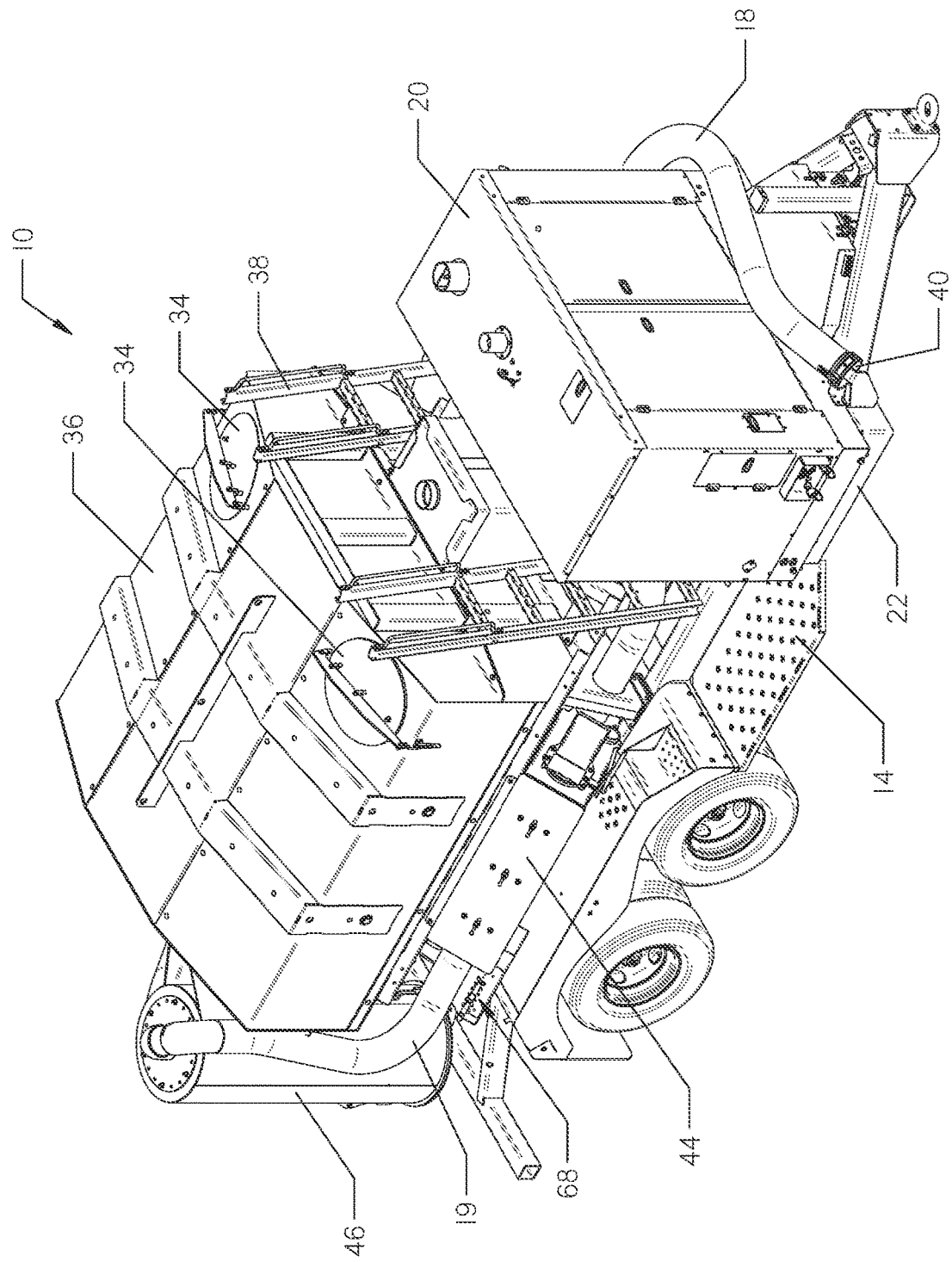
FIG. 2 is a perspective view of a second side of the vacuum system of FIG. 1.

Other than the inlet 90 and outlets 92, 94, the tank 16 is substantially sealed. As shown in FIG. 2, a set of hatches 34 are formed on a top end 36 of the tank 16 to provide access to the inside of the tank, if needed. A set of ladders 38 provide access to the hatches 34.

The hose 19 may have filtration systems interposed on it to clean the air before reaching the blower and power pack 20. As such, the hose 19 may comprise two or more sections. As shown in FIG. 2, air removed from the vacuum tank 16 travels through a cyclone separator 46 and a filter system 44.

The cyclone separator 46 is used to eliminate particulates from the air stream in the hose 19. Air within the separator 46 is moved in a spiraling motion, causing heavier particulates to diverge from the air and move toward the wall of the chamber. The cyclone separator 46 thus cleans the air of dust carried into the hose 19. Reducing dust further prolongs the life of the vacuum blower and filter 44 and reduces maintenance costs. With reference to FIG. 3, the cyclone separator 46 is attached to the rear end 27 of the tank 16. A door 48 is also provided on the cyclone separator 46 in order to empty the contents of the cyclone separator, if needed.

The filter system 44 is used to remove any remaining dust or particulates from the hose 18 before entering the vacuum blower powered by the power pack 20. One or more air filters may be provided within the filter system 44. The filter may be removed and replaced when it becomes clogged with particulates.

Air leaves the filter system 44 then travels through the hose 19 into a blower inlet 96.

Figure 10A:
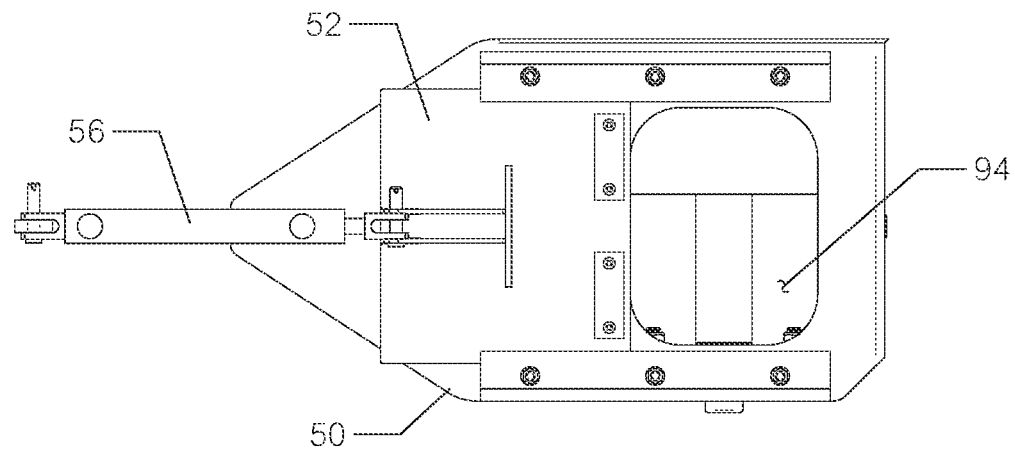
FIG. 10A is a bottom view of a door for use with the vacuum system, with the door in the open position.
Figure 10B:
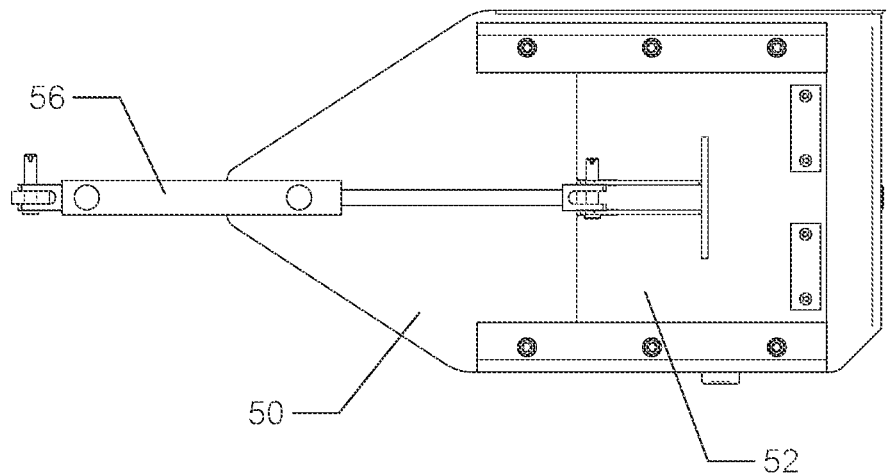
FIG. 10B is a bottom view of the door of FIG. 10A, with the door in the closed position.

With reference to FIGS. 3-4, the offloading hub 50 is formed on the rear end 27 of the tank 16 at the second outlet 94. The offloading hub 50 comprises a sliding door 52 formed on its bottom end 54 (FIG. 4) to cover the second outlet 94. As best shown in FIGS. 10A and 10B, the door 52 is opened and closed via a first hydraulic actuator 56. A light 58 positioned on a front end 60 of the offloading hub 50 may be illuminated if the door 52 is open. Material from inside the tank 16 may be released from the tank through the second outlet 94.

The second outlet 94 is ground facing and formed on a bottom of the tank 16 such that material from the tank 16 may be removed from the offloading hub 5o by operation of gravity.

Figure 6:
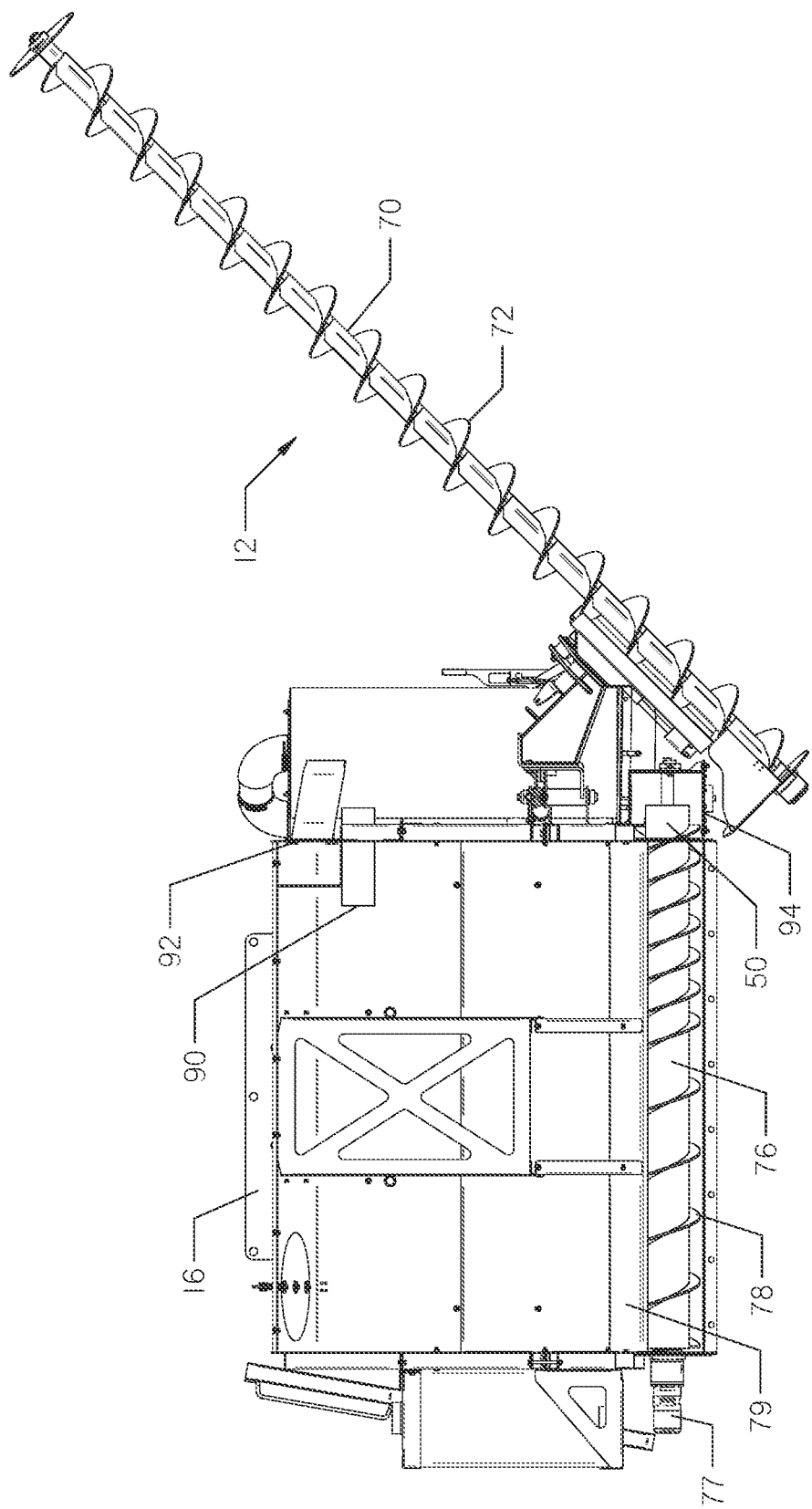
FIG. 6 is a side view of the first side of the vacuum tank. The left side of the tank has been removed. The external conveyor is shown in the raised position and a cover surrounding the external conveyor has been removed.
Figure 7:
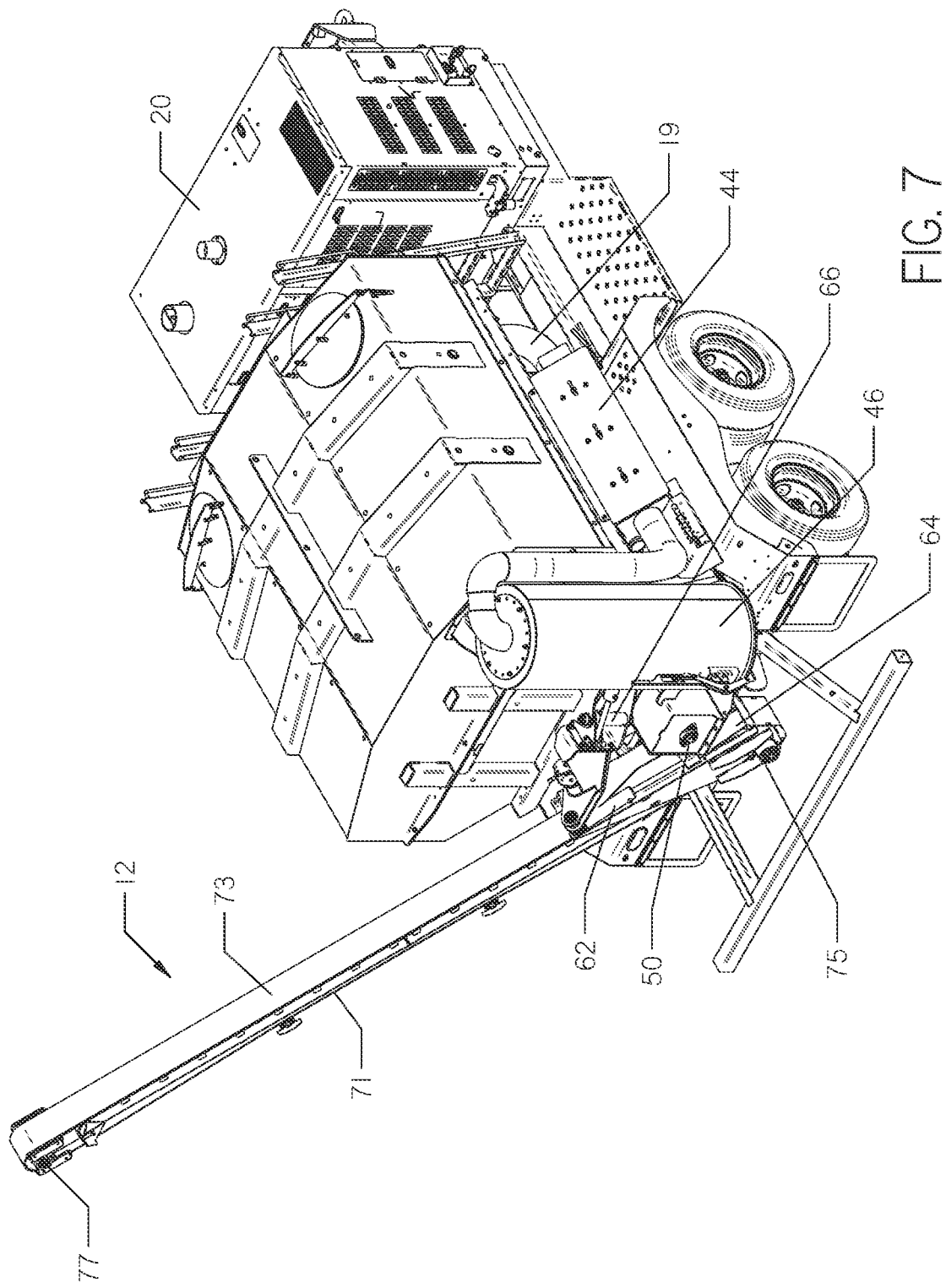
FIG. 7 is a rear perspective view of an alternative embodiment of the vacuum system. The external conveyor is shown in the raised position.
Figure 8:
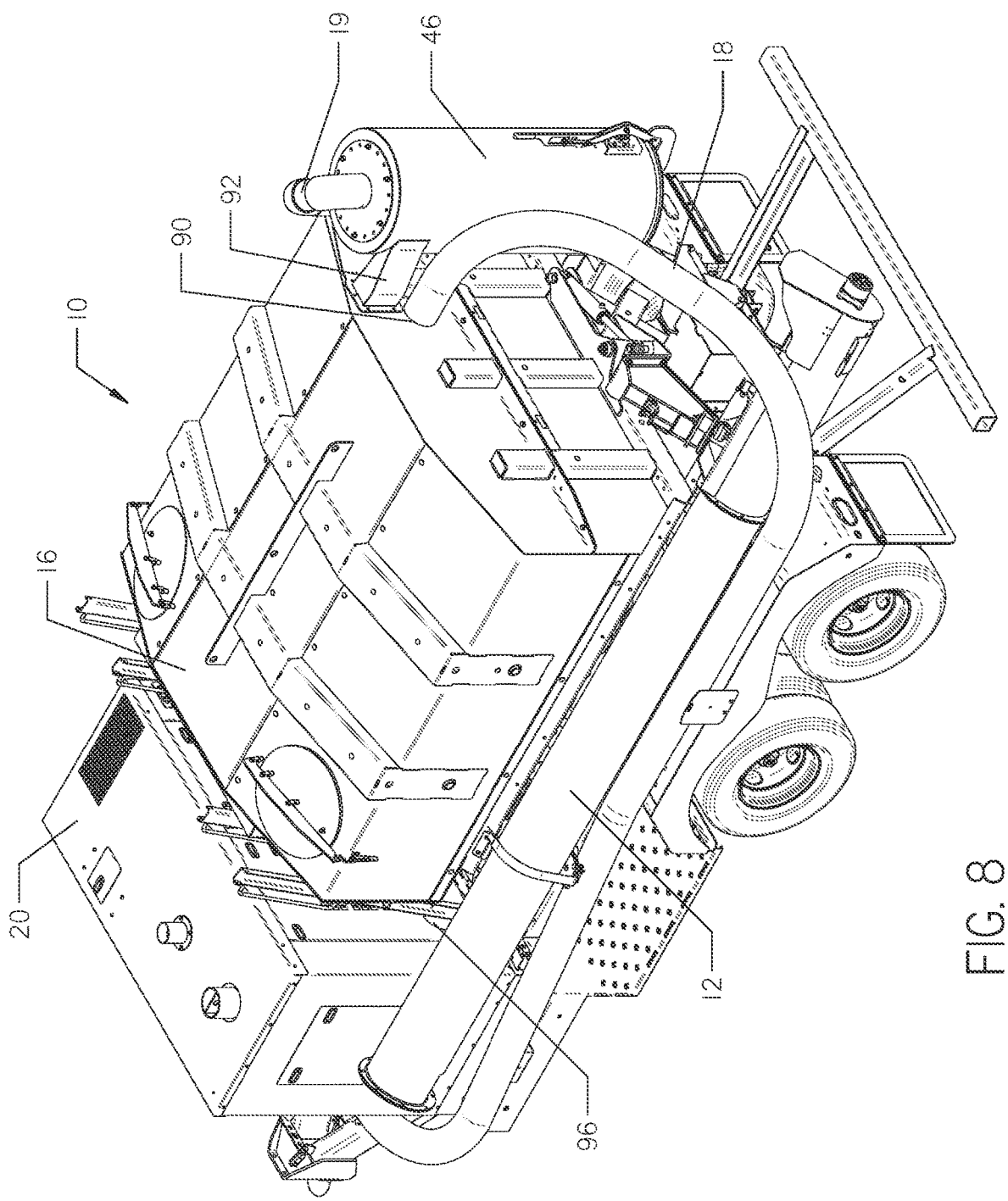
FIG. 8 is a back left top view of the vacuum system. The external conveyor is in the stowed position.

Turning now to FIGS. 5-7, the external conveyor 12 is moved to the raised position via a second hydraulic actuator 62. Once in the raised position, the external conveyor 12 is pivoted to position its opening 64 directly below the offloading hub 50. The external conveyor 12 is pivoted via a third hydraulic actuator 66. The hydraulic actuators 56, 62, 66 are operating by manipulating a set of controls 68 positioned on a second side 32 of the system 10 (FIG. 2).

The external conveyor 12 shown in FIG. 6 comprises a screw conveyor, or auger 70, having auger blades 72. The auger 70 is surrounded by a cylindrical cover 74 (FIG. 5). The cover 74 is removed in FIG. 6 to show the auger 70 structure.

Alternatively, the external conveyor 12 may comprise a conveyor 71 (FIG. 7) or other devices to raise loose materials to a higher elevation. The conveyor 71 comprises an endless belt 73 that rotates about a first drum 75 and a second drum 77. The endless belt 73 may have a series of ridges formed along its width and spaced apart from one another. Each ridge may have a repeating pattern, such as a chevron pattern. The ridges help bring material up the conveyor 71 during operation. A cover (not shown) may also surround the conveyor 71, if desired.

In either case, the external conveyor 12 as an input end situated near the second outlet 94 for receiving debris therethrough.

An internal conveyor or auger 76 having auger blades 78 is positioned at a bottom of the tank 16. Because the tank 16 has downwardly converging side walls, the material within the tank 16 is directed towards the internal auger 76. The internal auger 76 may rotate while the vacuum system 10 is operating or may remain stationary during operation. The auger blades 78 are configured to convey debris towards the offloading hub 50 when rotated. Preferably, as best shown in FIG. 6, the auger blades 78 may be more densely situated about the internal auger 76 near the offloading hub 50. To help move material towards the bottom of the tank 16, a vibrator may be installed.

Figure 9:
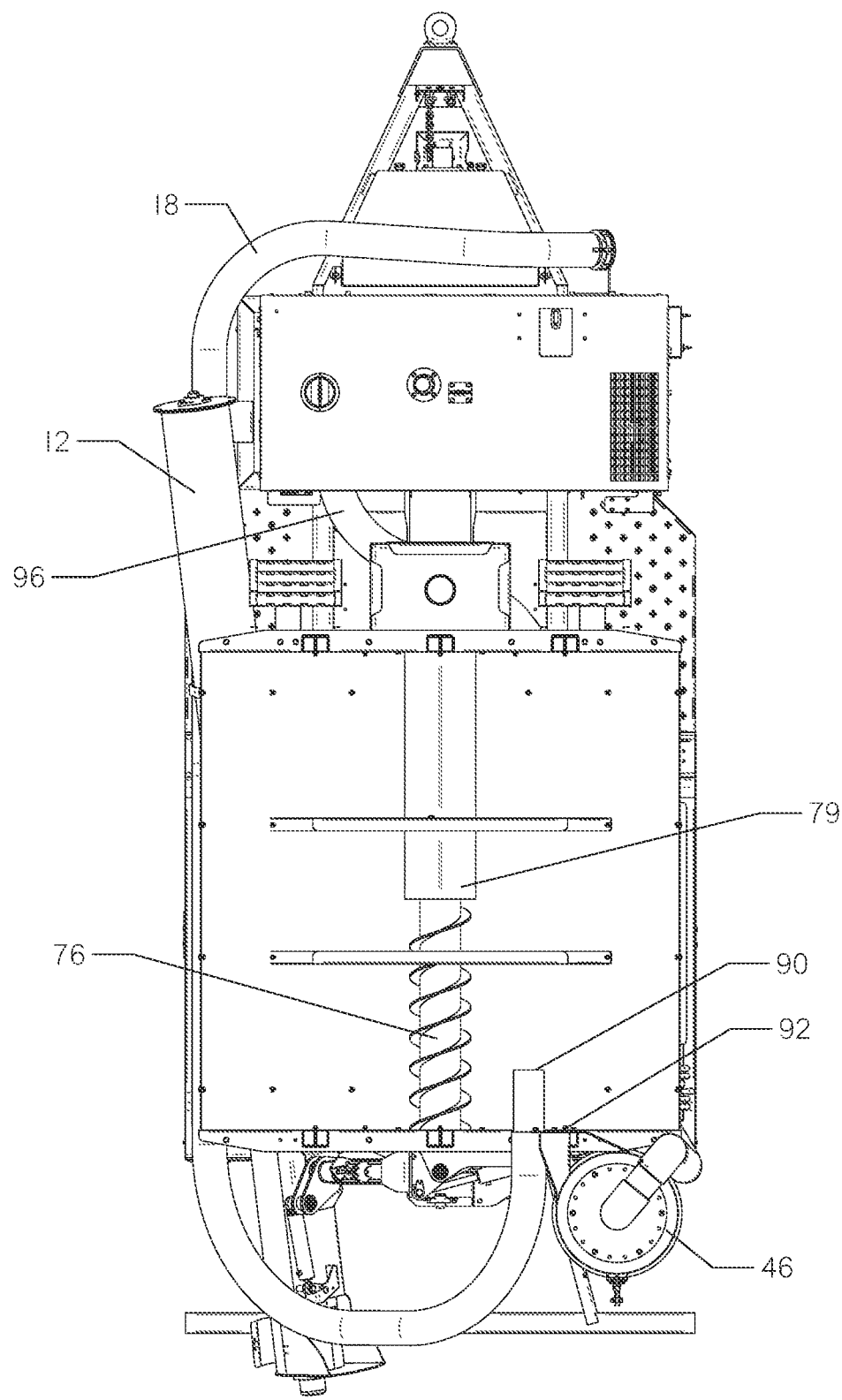
FIG. 9 is a top view of the vacuum system with the top panel of the tank removed. The auger shield disposed inside the tank is partially removed to see the auger therein.

A V-shaped shield 79 is disposed above the internal auger 76 to prevent the weight of debris within the tank 16 from impeding rotation of the internal auger 76. Debris on top of the shield 79 will move to each side of the internal auger 76. FIG. 9 shows this auger shield 79 partially cut-away to demonstrate the position of the internal auger 76.

The internal auger 76 is preferably disposed entirely within the tank 16. A belt conveyor or chain conveyor may be used in place of the internal auger 76 if desired. The internal auger 76 is rotated by an auger motor 77, which may be disposed outside of the tank 16.

To unload material from inside the tank 16, the external conveyor 12 may be moved to the raised position and positioned below the offloading hub 50. The door 52 to the offloading hub 50 is then opened (FIG. 4). The internal auger 76 rotates to move material inside of the tank 16 towards the ground-facing second outlet 94. Material exits the ground-facing second outlet 94 and falls into the opening 64 of the external conveyor 12.

The external conveyor 12 then transports material from its first end 82 or drum 75 to its second end 84 or drum 77. This may be accomplished by rotating the auger 70 or conveyor 71. Material is transported upwards via the auger blades 72 or ridges formed on the conveyor 71. Once the material reaches the second end 84 of the external conveyor 12 it may exit the external conveyor through an opening 86 formed at its second end 84 (FIG. 1). Alternatively, once the material reaches the second drum 77, it may simply fall off of the conveyor 71.

Material released from the external conveyor 12 may fall into a dump truck or other container 120 positioned underneath the second end 84 of the external conveyor 12. The external conveyor 12 allows material to be transported from the tank 16 to a position that is higher than a height of the tank 16. Once all of the material has been removed from the tank 16, the door 52 may be closed and the external conveyor 12 may be returned to its stowed position.

Figure 13:
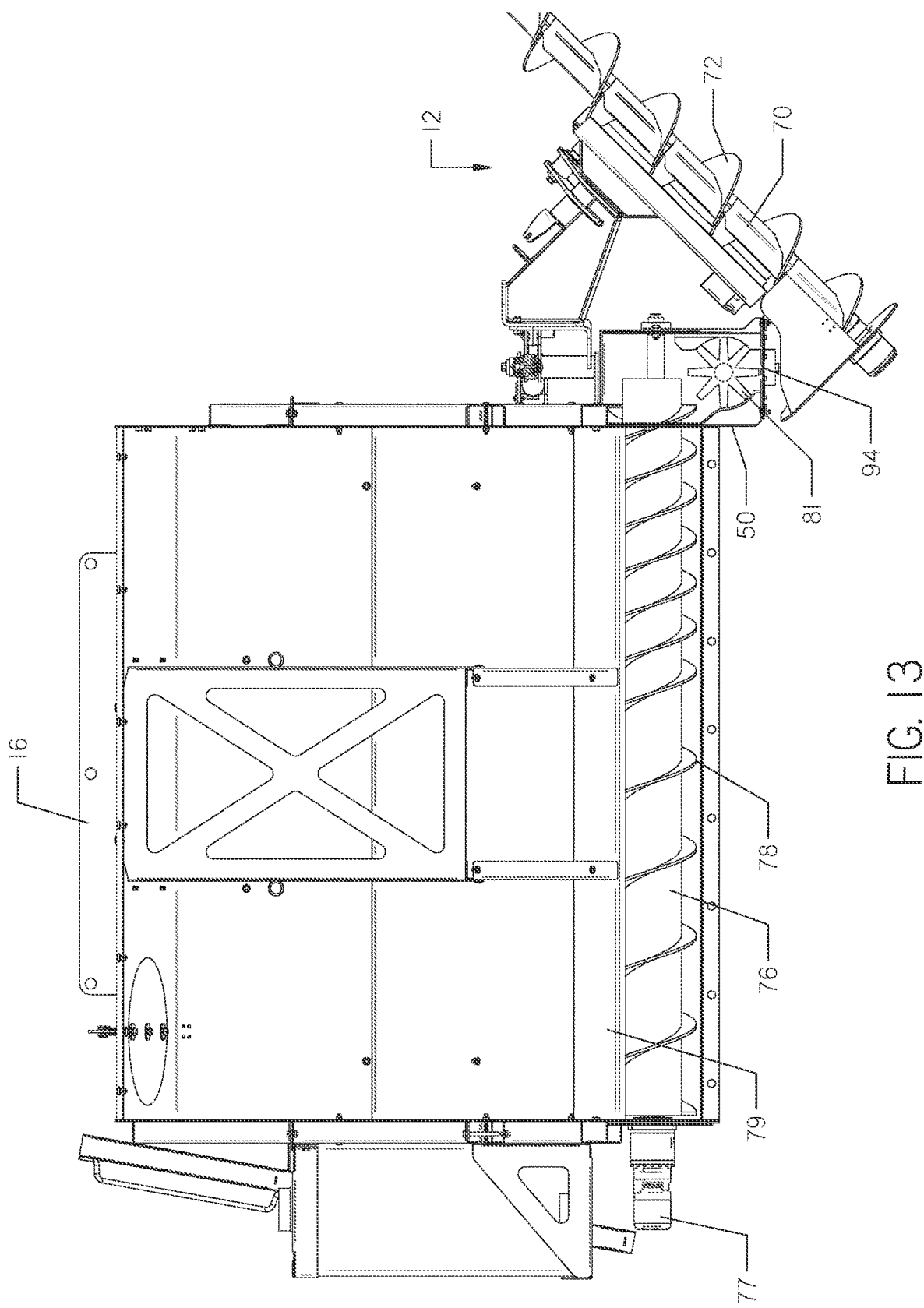
FIG. 13 is a side view of the first side of the vacuum tank having a rotary air lock at the second outlet. The left side of the tank has been removed. The external conveyor is shown in the raised position and a cover surrounding the external conveyor has been removed.

If the tank 16 can maintain sufficient air flow to operate, the door 52 may be opened during operation. For example, as shown in FIG. 13, a rotating airlock 81 may be used with the hub 50 to isolate the tank 16 from the second outlet 94. This allows the external conveyor 12 to transport material from the tank 16 to the dump container 120 while the vacuum system 10 operates. Oil or other lubricant may be sprayed on the internal auger 76 and the external conveyor 12 during operation.

Changes may be made in the construction, operation and arrangement of the various parts, elements, steps and procedures described herein without departing from the spirit and scope of the invention as described in the following claims.

The invention claimed is:

1. A method for moving solid material, comprising:
   pulling air and solid material through a tube and into a tank, wherein the tank has a vacuum pressure;
   conveying material with an internal conveyor to a discharge end of the tank, wherein the internal conveyor is situated entirely within the tank at the vacuum pressure;
   transferring material from the discharge end to a first end of an external conveyor, the external conveyor situated entirely outside the tank; and
   moving material away from the tank with the external conveyor.

2. The method of claim 1 in which each of the steps occur simultaneously with each of the other steps.

3. The method of claim 1 in which the step of conveying material with an internal conveyor occurs after ceasing the step of pulling air and solid material through a tube and into the tank.

4. The method of claim 1 in which the step of transferring material from the discharge end to the external conveyor occurs after ceasing the step of pulling air and solid material through the tube and into the tank.

5. The method of claim 1 in which the internal conveyor is an auger.

6. The method of claim 1 in which the step of transferring material from the discharge end to the external conveyor comprises:
   opening a ground-facing door at the discharge end, the door situated between the material within the tank and an end of the external conveyor.

7. The method of claim 1 in which the step of transferring material from the discharge end to the external conveyor comprises:
   rotating an element in an airlock to provide metered release of material from the tank to the external conveyor.

8. The method of claim 1 further comprising:
   releasing the material at a second end of the external conveyor.

9. The method of claim 1 wherein the external conveyor is an auger.

10. The method of claim 9 in which the internal conveyor is an auger.

11. The method of claim 1 in which:
   the step of pulling air and solid material through the tube comprises:
     placing an open end of the tube proximate a solid material to be removed;
     actuating a blower in communication with the tube;
     forcing the air through the tube and out of the tank through the blower; and
     filtering the tank such that the solid material remains within the tank.

12. The method of claim 1 in which the tank comprises downwardly converging sidewalls and in which the internal conveyor is disposed between the downwardly converging sidewalls.

13. A method of handling spoils comprising:
   operating a blower to pull air and spoils from an excavation site into a tank;
   operating an internal conveyor to move spoils to a discharge end of the tank, wherein the entire internal conveyor is disposed within the tank at a vacuum pressure; and
   operating an external conveyor to convey spoils away from the discharge end of the tank, wherein the entire external conveyor is disposed outside the tank.

14. The method of claim 13 further comprising:
   maintaining a ground-facing door disposed at the discharge end of the tank and above the external conveyor in an open state.

15. The method of claim 14 in which the ground-facing door is maintained in an open state while the blower is operated.

16. The method of claim 13 further comprising;
   removing air from the tank with the blower; and
   cleaning the removed air.

17. The method of claim 13 further comprising:
   placing an end of the external conveyor above a dump container;
   such that spoils conveyed away from the discharge end of the tank are deposited in the dump container when they reach the end of the external conveyor.

18. The method of claim 13 further comprising:
   with a microtrenching machine, removing spoils from a trench.

19. The method of claim 18, further comprising:
   placing an end of the external conveyor above the dump container such that spoils conveyed away from the discharge end of the tank are deposited in the dump container when they reach the end of the external conveyor.

20. The method of claim 19 in which the steps are performed simultaneously.

\* \* \* \* \*